E. DRESLER.
COMPRESSED GAS LAMP.
APPLICATION FILED DEC. 12, 1914.
1,134,319.
Patented Apr. 6, 1915.
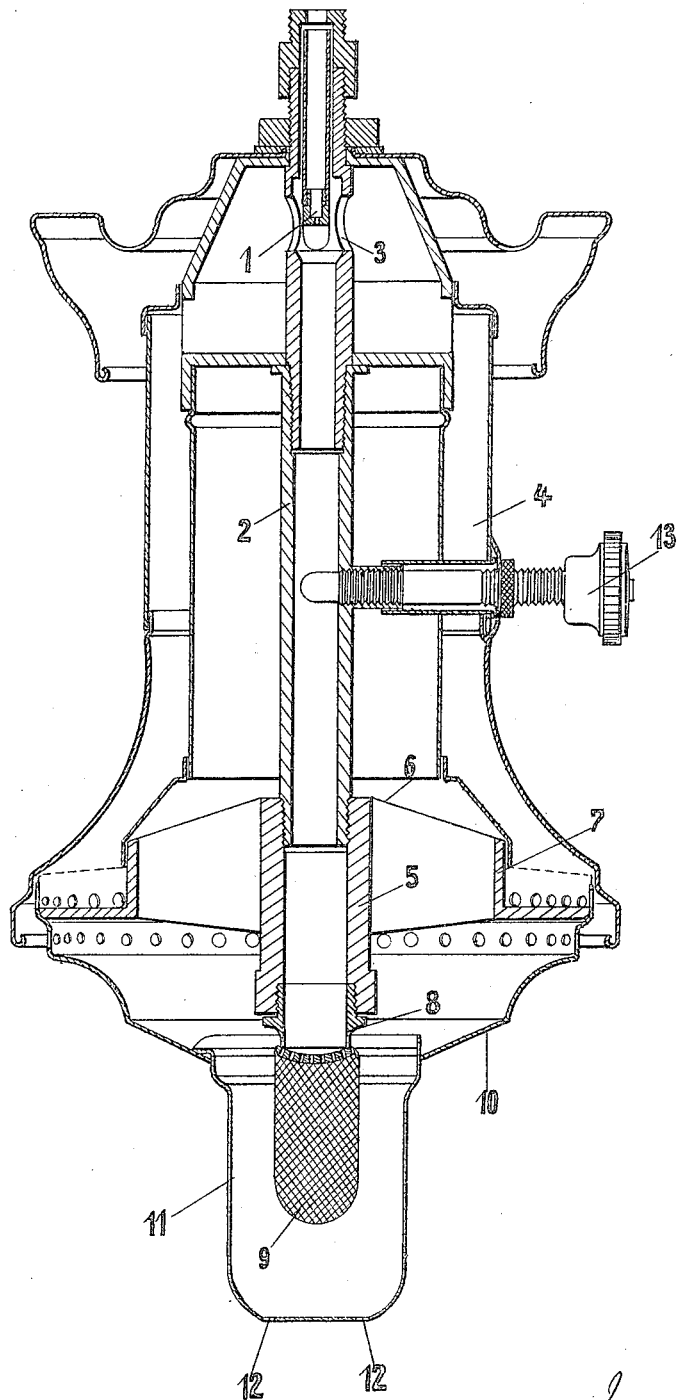

UNITED STATES PATENT OFFICE.

ERNST DRESLER, OF NEUKÖLLN, GERMANY.

COMPRESSED-GAS LAMP.

1,134,319.　Specification of Letters Patent.　Patented Apr. 6, 1915.

Application filed December 12, 1914. Serial No. 876,766.

*To all whom it may concern:*

Be it known that I, ERNST DRESLER, a subject of the German Emperor, residing at Neukölln, in the Kingdom of Prussia, German Empire, have invented certain new and useful Improvements in Compressed-Gas Lamps, of which the following is a specification.

My invention relates to a compressed gas lamp and has for its object to provide means for strongly heating the primary air prior to its admission into the mixing tube, at the same time providing for the admission of secondary air.

Although lamps for compressed gas may be so constructed, that no secondary air is used, tests have proved the advisability of using a certain amount of secondary air. The lamp, according to my invention, is, therefore, so constructed, that secondary air is admitted to the incandescent mantle. In the manufacture of compressed gas lamps chimneys have been provided surrounding the incandescent mantle, but these chimneys have no inlet openings for the admission of secondary air, which results in the flame tending to penetrate the mantle and to damage the chimney, while, on the other hand, the mantle being touched by the escaping gas alone, only partial combustion takes place.

In the lamp, according to my invention, a chimney is, therefore, provided having inlet openings for the admission of secondary air and closely surrounding the mantle, whereby the defects referred to are eliminated, while, at the same time, the large glass bowls generally found in this type of lamp, can be dispensed with.

My new lamp combines the advantages of a lamp in which the primary air is heated prior to its entering the mixing tube with those of a lamp having small dimensions.

One construction according to my invention is shown in the accompanying drawing, being a central longitudinal section of the lamp. The compressed gas flows from the injector 1 into the mixing tube 2, into which the gas draws through the openings 3 from the heated chamber 4 the desired amount of heated primary air. To the lower end of the mixing tube 2 is secured a cast piece 5 which is held in the lamp casing by ribs 6 and an annular support 7. The cast piece 5 carries at its lower end the burner 8 from which the incandescent mantle 9 is suspended. In the reflector shaped body 10 of the lamp casing is held the glass chimney 11 which, at its lower end is provided with inlet openings 12. The chimney 11 is made of a refractory glass, *e. g.* quartz, or a similar material.

A set screw 13 is provided for controlling the amount of primary air. The secondary air, which is admitted through the openings 12 in the lamp chimney, touches the incandescent mantle and protects the inside of the chimney 11 against excessive heat. It is advantageous to provide the openings in the flat bottom of the chimney 11 so that the incandescent mantle is not struck directly by any horizontal blasts of wind.

Besides the advantage just mentioned, the use of the secondary air prevents also the formation of carbon-monoxid which frequently occurs in lamps which are not supplied with secondary air.

My lamp yields a great amount of light while consuming a minimum of gas, the narrow chimney surrounding the incandescent mantle increasing the effect as it reduces, to a great extent, the loss of heat of the incandescent mantle.

I claim as my invention:

1. In a compressed gas lamp the combination of a gas burner, an air chamber directly exposed to the heat of the flame, means for supplying compressed gas to said burner mixed with heated air drawn from said air chamber, an incandescent mantle, and a practically closed narrow glass chimney closely surrounding the mantle and provided with small openings for admitting cool outside air for the purpose described.

2. In a compressed gas lamp the combination of a mixing tube, a gas burner attached to the lower end thereof, an air chamber surrounding said mixing tube and directly exposed to the heat of the flame, means for supplying compressed gas to said mixing tube, means permitting heated air to be drawn from said air chamber into said mixing tube, an incandescent mantle, and a practically closed narrow glass chimney closely surrounding the mantle and provided with small openings in its otherwise closed bottom for admitting cool outside air for the purpose described.

In testimony whereof I affix my signature in presence of two witnesses.

ERNST DRESLER.

Witnesses:
  WOLDEMAR HAUPT,
  HENRY HASPER.

Copies of this patent may be obtained for five cents each, by addressing the "Commissioner of Patents, Washington, D. C."